(12) United States Patent
Shimamura et al.

(10) Patent No.: US 7,553,586 B2
(45) Date of Patent: Jun. 30, 2009

(54) ALKALINE BATTERY

(75) Inventors: Harunari Shimamura, Osaka (JP);
Koshi Takamura, Osaka (JP);
Nobuharu Koshiba, Nara (JP)

(73) Assignee: Panasonic Corporation, Osaka (JP)

( * ) Notice: Subject to any disclaimer, the term of this patent is extended or adjusted under 35 U.S.C. 154(b) by 302 days.

(21) Appl. No.: 10/588,062

(22) PCT Filed: Mar. 16, 2005

(86) PCT No.: PCT/JP2005/004693

§ 371 (c)(1),
(2), (4) Date: Aug. 1, 2006

(87) PCT Pub. No.: WO2005/104277

PCT Pub. Date: Nov. 3, 2005

(65) Prior Publication Data
US 2007/0141466 A1 Jun. 21, 2007

(30) Foreign Application Priority Data
Apr. 23, 2004 (JP) .............................. 2004-127847

(51) Int. Cl.
*H01M 4/42* (2006.01)
(52) U.S. Cl. ...................................... 429/229
(58) Field of Classification Search .................. 429/229
See application file for complete search history.

(56) References Cited

U.S. PATENT DOCUMENTS 3,844,838 A * 10/1974 Louzos ....................... 429/206
6,022,639 A 2/2000 Urry 2003/0079337 A1 5/2003 Woodnorth et al.

FOREIGN PATENT DOCUMENTS

| CN | 1210624 | | 3/1999 |
|---|---|---|---|
| JP | 2-216761 A | | 8/1990 |
| JP | 5-013073 | * | 1/1993 |
| JP | 7-122276 A | | 5/1995 |
| JP | 8-78017 A | | 3/1996 |
| JP | 10-83811 A | | 3/1998 |
| JP | 2000-36318 A | | 2/2000 |
| WO | WO 98/25069 | | 5/1998 |
| WO | WO 99/34462 | | 7/1999 |

OTHER PUBLICATIONS

Chinese Office Action with English Translation, issued in Chinese Patent Application No. 2005800049356, dated on Jan. 25, 2008.
Meng Fan-ming; "Study on Active Zinc Powder Used for Aircraft Zinc/ Silver Secondary Batteries" China Academic Journal Electronic Publishing House.

* cited by examiner

*Primary Examiner*—Patrick Ryan
*Assistant Examiner*—Thomas H. Parsons
(74) *Attorney, Agent, or Firm*—McDermott Will & Emery LLP

(57) ABSTRACT

An alkaline battery includes: a negative electrode including a zinc or zinc alloy powder as an active material; an alkaline electrolyte; and a positive electrode. The zinc or zinc alloy powder has a specific surface area of 0.01 to 10 $m^2/g$, and the weight ratio of the electrolyte to the negative electrode active material is in the range of 0.1 to 2. This invention can provide an alkaline battery that is improved in electrolyte leakage resistance and high-rate discharge characteristics.

2 Claims, 2 Drawing Sheets

ALKALINE BATTERY

RELATED APPLICATIONS

This application is the U.S. National Phase under 35 U.S.C. § 371 of International Application No. PCT/JP2005/004693, filed on Mar. 16, 2005, which in turn claims the benefit of Japanese Application No. 2004-127847, filed on Apr. 23, 2004, the disclosures of which Applications are incorporated by reference herein.

1. Technical Field

The present invention relates to alkaline batteries using a zinc or zinc alloy powder as a negative electrode active material, and, more particularly, to prevention of gas production and an improvement in high-rate discharge characteristics.

1. Background Art

A conventional problem with alkaline batteries using a zinc or zinc alloy powder as a negative electrode active material is that the active material powder corrodes in an alkaline electrolyte to produce hydrogen gas. Accumulation of this gas in the battery increases the battery inner pressure, thereby causing a problem of electrolyte leakage.

To solve this problem, various techniques have been examined. Japanese Laid-Open Patent Publication No. Hei 8-78017 discloses that regulating the specific surface area of a zinc alloy powder to 0.013 to 0.03 $m^2/g$ decreases the reactivity of the active material powder with electrolyte, thereby reducing the amount of gas produced.

Patent Document 1: Japanese Laid-Open Patent Publication No. Hei 8-78017

DISCLOSURE OF INVENTION

Problem That the Invention is to Solve

However, the following problems arise. When a zinc or zinc alloy powder serving as an active material has a small specific surface area, i.e., a large particle size, the amount of the active material powder filled in a limited volume is small, thereby resulting in a decrease in capacity. On the other hand, when a zinc or zinc alloy powder has a large specific surface area, the amount of electrolyte per unit surface area of the active material powder is small, thereby resulting in degradation of the high-rate discharge characteristics of the battery. When the amount of electrolyte per unit surface area of the active material powder is insufficient, the concentration of $Zn(OH)_4^{2-}$ produced during charge sharply increases at the surface of the active material particles. These ions increase resistance, thereby resulting in a significant degradation of discharge characteristics, particularly high-rate discharge characteristics. Further, the reactivity of the active material with electrolyte becomes excessively high, so that the amount of hydrogen gas production sharply increases.

An object of the present invention is to optimize the balance between the amount of electrolyte per unit surface area of a negative electrode active material and the specific surface area of the negative electrode active material in order to improve the high-rate discharge characteristics of a battery, and to suppress gas production in order to improve the leakage-resistance characteristics of the battery.

Means for Solving the Problem

In order to solve the problems as described above, the present invention relates to an alkaline battery including: a negative electrode including a negative electrode mixture that contains a zinc or zinc alloy powder as an active material; an alkaline electrolyte; and a positive electrode. The negative electrode active material powder has a specific surface area of 0.01 to 10 $m^2/g$, and the weight ratio of the electrolyte to the negative electrode active material is 0.1 to 2.

It is preferred that the negative electrode mixture contain 0.15 to 0.9 wt % of lithium hydroxide.

Effects of the Invention

The present invention can optimize the relation between a negative electrode active material powder and electrolyte and provide an alkaline battery that is improved in electrolyte leakage resistance and high-rate discharge characteristics.

BEST MODE FOR CARRYING OUT THE INVENTION

The present invention relates to an alkaline battery including: a negative electrode including a negative electrode mixture that contains a zinc or zinc alloy powder as an active material; an alkaline electrolyte; and a positive electrode. The negative electrode active material powder has a specific surface area of 0.01 to 10 $m^2/g$, and the weight ratio of the electrolyte to the negative electrode active material powder (electrolyte/negative electrode active material) is in the range of 0.1 to 2.

It is preferred that the negative electrode mixture contain 0.15 to 0.9 wt % of lithium hydroxide.

In the alkaline battery of the present invention, the amount of electrolyte per unit surface area of the negative electrode active material powder is optimized. Thus, $Zn(OH)_4^{2-}$ around the negative electrode active material powder is diffused, so that $Zn(OH)_2$ and $ZnO$ are prevented from depositing on the surface of the negative electrode active material powder. As a result, the discharge characteristics, particularly high-rate discharge characteristics, of the battery improve.

If the weight ratio (electrolyte)/(negative electrode active material) is less than 0.1, the concentration of $Zn(OH)_4^{2-}$ around the negative electrode active material powder sharply increases, thereby resulting in degradation of the high-rate discharge characteristics of the battery. Also, if this ratio is greater than 2, the ratio of the electrolyte to the negative electrode mixture increases excessively. As a result, the amount of the active material powder in the negative electrode mixture decreases, thereby resulting in a decrease in battery capacity.

On the other hand, if the specific surface area of the negative electrode active material powder is less than 0.01 $m^2/g$, the size of the active material particles themselves becomes too large, so that the reactivity of the active material with the electrolyte decreases, thereby leading to a decrease in capacity. On the other hand, if the specific surface area of the negative electrode active material powder is greater than 10 $m^2/g$, the reactivity of the active material with the electrolyte becomes too high, thereby promoting the corrosion of the active material powder and increasing the amount of gas produced.

Further, when the negative electrode mixture contains 0.15 to 0.9 wt % of lithium hydroxide, the corrosion of the zinc or zinc alloy powder is suppressed, so that the production of hydrogen gas can be prevented.

As the zinc alloy, a zinc alloy containing at least one selected from the group consisting of Al, Bi, In, and Ca, having high hydrogen overvoltages, is effective for suppressing gas production and preferable. Besides, Sn or Pb is also effective as the element to be added.

Embodiment 1

Figure 1:
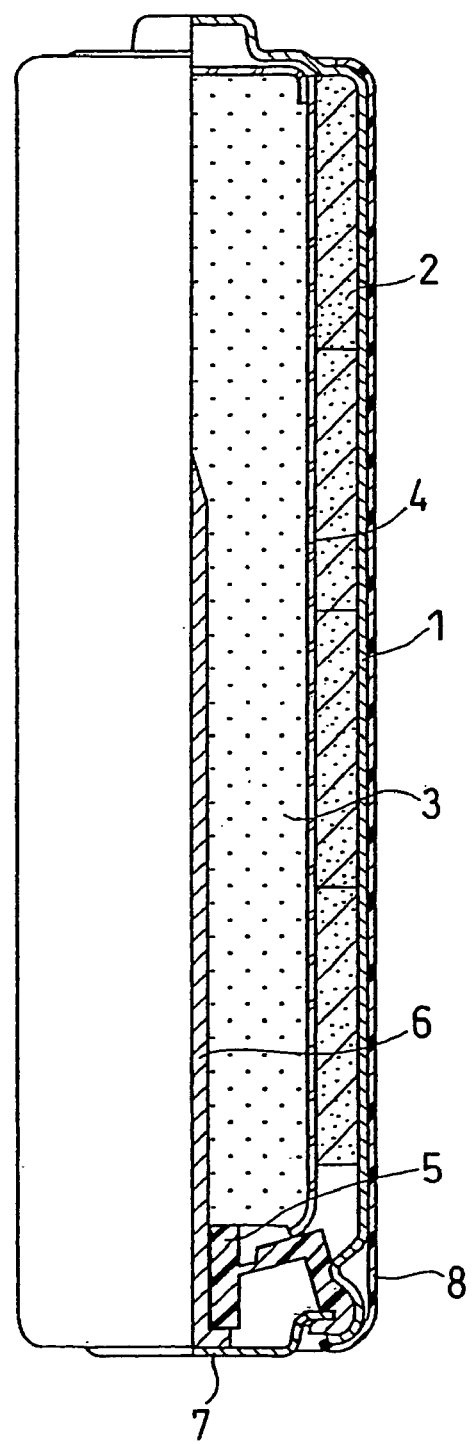
FIG. 1 is a longitudinal sectional view of a cylindrical alkaline dry battery according to an Example of the present invention.

The structure of an alkaline dry battery is described with reference to FIG. 1, which is a partially sectional front view.

A battery case 1 contains a positive electrode mixture 2 in the form of short cylindrical pellets, a separator 4, and a gelled negative electrode 3. The battery case 1 may be a steel case whose inner face is plated with nickel. A plurality of the positive electrode mixture pellets 2 are contained in the battery case 1 so as to closely adhere to the inner face thereof. The separator 4 is placed on the inner side of the positive electrode mixture 2, and the gelled negative electrode 3 is filled in the space on the inner side of the separator 4.

The positive electrode mixture 2 is prepared as follows. First, manganese dioxide, graphite, and an electrolyte are mixed together in a weight ratio of 90:6:1. The resultant mixture is sufficiently stirred and then compression molded into flakes. Subsequently, the positive electrode mixture flakes are crushed into granules. The positive electrode mixture granules are then classified with a sieve to obtain granules of 10 to 100 mesh. The resultant granules are compression molded into hollow cylinders to obtain the positive electrode mixture pellets 2. Four positive electrode mixture pellets 2 are inserted into the battery case 1, and the positive electrode mixture 2 is again molded in the battery case 1 by means of a compressing device so as to closely adhere to the inner wall of the battery case 1.

The separator 4, which is a cylinder with a bottom, is placed in the middle of the positive electrode mixture 2 that is placed in the battery case 1 in the above manner, and a predetermined amount of an alkaline electrolyte is injected into the space on the inner side of the separator 4. After the lapse of a predetermined time, the gelled negative electrode mixture 3, which comprises the alkaline electrolyte, a gelling agent, and a zinc alloy powder, is filled into the space on the inner side of the separator 4. The gelled negative electrode mixture 3 used is a mixture composed of 1 wt % of sodium polyacrylate serving as the gelling agent, 33 wt % of the alkaline electrolyte, and 66 wt % of the zinc alloy powder. Also, the separator 4 used is a 220-μm-thick non-woven fabric composed of polyvinyl alcohol fibers and rayon fibers in a weight ratio of 7:10. The density of the separator is 0.30 g/cm$^3$, and the size of the separator fibers is 0.3 denier. The ratio of the fibers is not limited to this, and other fibers may be added as a binder.

Subsequently, a negative electrode current collector 6 is inserted into the middle of the gelled negative electrode mixture 3. The negative electrode current collector 6 is integrally combined with a gasket 5 and a bottom plate 7 serving as the negative electrode terminal. The open edge of the battery case 1 is crimped onto the circumference of the bottom plate 7 with the edge of the gasket 5 interposed therebetween, to seal the opening of the battery case 1. Lastly, the outer face of the battery case 1 is covered with an outer label 8.

The electrolyte used is an alkaline electrolyte prepared by dissolving KOH in water. The KOH concentration of the alkaline electrolyte is 30 wt % to 45 wt %. In order to suppress the self-discharge of zinc, ZnO may be dissolved in the electrolyte, and with respect to the dissolution amount, ZnO may be dissolved until it becomes saturated at each alkali concentration. To reduce the production of hydrogen gas, an organic anti-corrosive agent may be dispersed in the electrolyte.

Any organic anti-corrosive agent may be used as long as it suppresses the production of hydrogen, and an example is fluoroalkyl polyoxyethylene (trade name: Surflon #S-161). Also, the electrolyte may be in the state of gel. Any gelling agent may be used if it combines with the alkaline electrolyte to form gel, and examples other than sodium polyacrylate include carboxymethyl cellulose, polyvinyl alcohol, polyethylene oxide, polyacrylic acid, sodium polyacrylate, chitosan gel, and modified materials thereof obtained by changing the polymerization reaction, cross-linking degree, or molecular weight.

Embodiment 2

Figure 2:
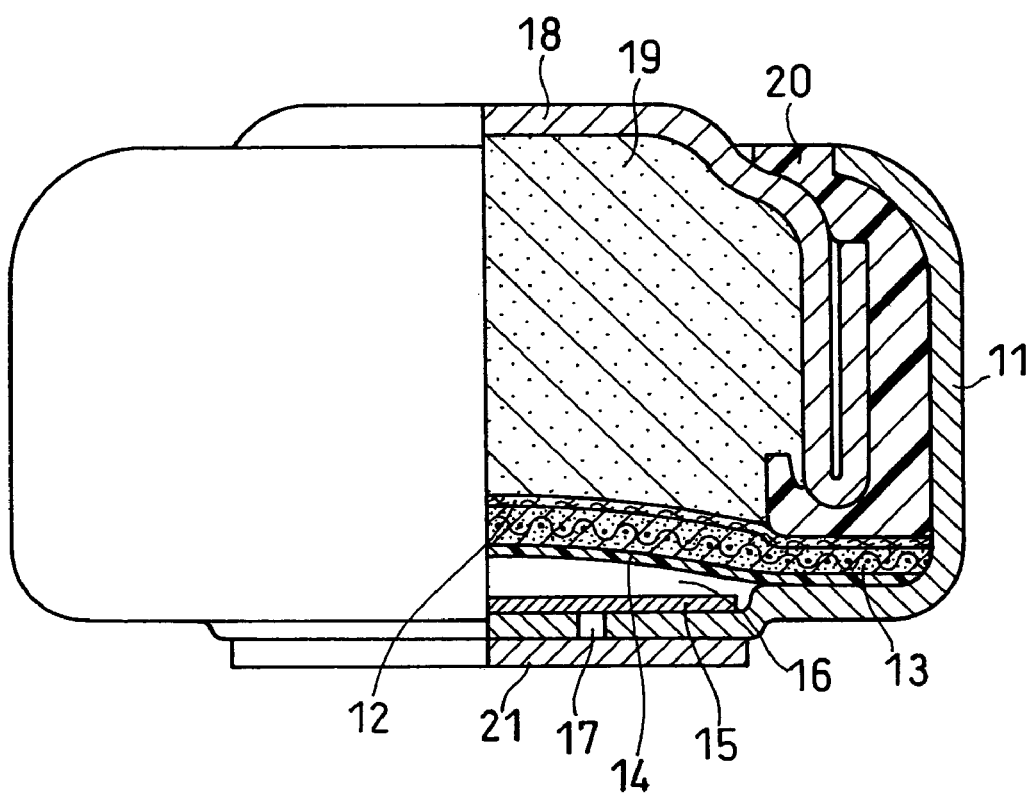
FIG. 2 is a longitudinal sectional view of an air battery according to an Example of the present invention.

The structure of an air battery is described with reference to FIG. 2. FIG. 2 is a partially sectional front view of an air battery. FIG. 2 illustrates the structure immediately after the fabrication; due to discharge, zinc in the negative electrode changes to a zinc oxide and undergoes a volume expansion, so that the space in an air diffusion chamber 16 changes to a size that is so large as to accommodate only an air diffusion paper 15.

A case serving as the positive electrode terminal is represented by numeral 11 and contains a separator 12, an air electrode 13 and a water-repellent film 14 on the bottom. Under them is the air diffusion chamber 16 for accommodating the air diffusion paper 15. The water-repellent film 14 allows oxygen to be supplied to the air electrode 13 and prevents an electrolyte from leaking out of the battery. The air diffusion paper 15 permits uniform diffusion of air that is introduced from an air vent 17 in the bottom of the case 11 into the case.

A sealing plate 18 serving as the negative electrode terminal contains a negative electrode mixture 19 comprising zinc or a zinc alloy, and a ring-shaped insulating gasket 20 is fitted to the periphery thereof. The sealing plate is combined with the case 11, and the edge of the case 11 is crimped onto the sealing plate with the insulating gasket 20 therebetween, to seal the power generating element. Seal paper 21 affixed to the outer bottom face of the case closes the air vent 17 when the battery is not used, thereby blocking the entrance of air and preventing battery deterioration due to self-discharge. The air electrode 13 is produced by bonding a catalyst composition mainly composed of a metal oxide such as manganese dioxide, graphite, activated carbon, and a fluorocarbon binder to a current collector net under pressure.

EXAMPLES

Examples of the present invention are described below.

Example 1

AA-type alkaline dry batteries as illustrated in Embodiment 1 and coin-type PR2330 air batteries as illustrated in Embodiment 2 were fabricated and evaluated for their characteristics.

The zinc or zinc alloy powders used were synthesized by atomization and classified. In consideration of gas production, the zinc alloys used were alloys containing at least one selected from the group consisting of Al, Bi, In, and Ca at 50 to 1000 ppm.

The specific surface areas of the zinc or zinc alloy powders were measured by a nitrogen adsorption method using an ASAP2010 analyzer available from Micromeritics Instrument Corporation. Preliminary drying of the powders (deaeration) were performed in a vacuum at 120° C. for 5 hours.

Table 1 shows the specific surface areas of the zinc and zinc alloy powders.

TABLE 1

| Material | Metal added to Zinc | Specific surface area of zinc powder ($m^2/g$) |
|---|---|---|
| A1 | None | 0.005 |
| A2 | None | 0.01 |
| A3 | None | 0.1 |
| A4 | None | 1 |
| A5 | None | 5 |
| A6 | None | 10 |
| A7 | None | 20 |
| A8 | Al | 0.005 |
| A9 | Al | 0.01 |
| A10 | Bi | 0.1 |
| A11 | In | 1 |
| A12 | Ca | 2 |
| A13 | Al and Bi | 5 |
| A14 | Al and In | 6 |
| A15 | Bi and In | 8 |
| A16 | Bi and Ca | 9 |
| A17 | Al, Bi and In | 10 |
| A18 | Ca, Bi and In | 10 |
| A19 | Al, Bi, In and Ca | 10 |
| A20 | Al, Bi, In and Ca | 15 |

Table 2 shows the characteristics of the batteries using the negative electrode active materials as listed in Table 1. The characteristics of the batteries were measured as follows.

The respective batteries were placed in a constant temperature oven at 20° C. and a relative humidity of 60% and discharged at a predetermined current density to obtain discharge capacity C2 (mAh). Also, the theoretical capacity C1 (mAh) was calculated from the weight of Zn of each battery. The proportion P (%) of the discharge capacity C2 to the theoretical capacity C1 was calculated from the following formula (1) to evaluate the high-rate discharge characteristics of each battery. The higher the P value, the better are high-rate discharge characteristics.

$$P(\%) = (C2/C1) \times 100 \quad (1)$$

For the alkaline dry batteries, P values obtained from a 1 A discharge and battery capacities on a 50 mA discharge are shown. For air batteries, P values obtained from a 160 mA discharge and battery capacities on a 3 mA discharge are shown.

TABLE 2

| | | Air battery | | Alkaline dry battery | |
|---|---|---|---|---|---|
| Material | Electrolyte/ (zinc or zinc alloy) weight ratio | P (%) on 160 mA discharge | Capacity (mAh) on 3 mA discharge | P (%) on 1 A discharge | Capacity (mAh) on 50 mA discharge |
| A1 | 0.03 | 2 | 665 | 2 | 1829 |
| A2 | 0.04 | 5 | 760 | 6 | 2090 |
| A3 | 0.05 | 8 | 755 | 9 | 2076 |
| A4 | 0.06 | 10 | 799 | 11 | 2197 |
| A5 | 0.07 | 11 | 820 | 12 | 2255 |
| A6 | 0.08 | 12 | 825 | 13 | 2269 |
| A7 | 0.09 | 14 | 410 | 15 | 1128 |
| A8 | 0.05 | 2 | 562 | 2 | 1546 |
| A9 | 0.02 | 2 | 762 | 2 | 2096 |
| A10 | 0.02 | 3 | 756 | 3 | 2079 |
| A11 | 0.03 | 3 | 765 | 3 | 2104 |
| A12 | 0.03 | 4 | 760 | 4 | 2090 |
| A13 | 0.04 | 8 | 778 | 9 | 2140 |
| A14 | 0.04 | 11 | 802 | 12 | 2206 |
| A15 | 0.05 | 12 | 815 | 13 | 2241 |
| A16 | 0.05 | 13 | 820 | 14 | 2255 |
| A17 | 0.06 | 15 | 830 | 16 | 2283 |
| A18 | 0.07 | 15 | 835 | 17 | 2296 |
| A19 | 0.08 | 17 | 840 | 19 | 2310 |
| A20 | 0.09 | 17 | 410 | 19 | 1128 |
| A1 | 0.1 | 23 | 855 | 25 | 2351 |
| A2 | 0.1 | 65 | 860 | 70 | 2365 |
| A3 | 0.2 | 70 | 930 | 76 | 2558 |
| A4 | 0.7 | 70 | 925 | 76 | 2544 |
| A5 | 1.2 | 71 | 820 | 77 | 2255 |
| A6 | 2 | 71 | 815 | 77 | 2241 |
| A7 | 2 | 72 | 411 | 78 | 1130 |
| A8 | 0.1 | 25 | 820 | 27 | 2255 |
| A9 | 0.1 | 63 | 845 | 68 | 2324 |
| A10 | 0.2 | 70 | 935 | 76 | 2571 |
| A11 | 0.3 | 70 | 930 | 76 | 2558 |
| A12 | 0.5 | 71 | 925 | 77 | 2544 |
| A13 | 0.7 | 71 | 920 | 77 | 2530 |
| A14 | 0.9 | 71 | 850 | 77 | 2338 |
| A15 | 1 | 71 | 720 | 77 | 1980 |
| A16 | 1.2 | 71 | 700 | 77 | 1925 |
| A17 | 1.5 | 72 | 650 | 78 | 1788 |
| A18 | 1.8 | 73 | 580 | 79 | 1595 |
| A19 | 2 | 73 | 550 | 79 | 1513 |
| A20 | 2 | 73 | 399 | 79 | 1097 |
| A1 | 2.1 | 23 | 266 | 24 | 732 |
| A2 | 2.2 | 75 | 344 | 79 | 946 |
| A3 | 2.25 | 80 | 320 | 84 | 880 |
| A4 | 2.3 | 81 | 342 | 85 | 941 |
| A5 | 2.35 | 82 | 302 | 86 | 831 |
| A6 | 2.4 | 82 | 288 | 86 | 792 |
| A7 | 2.5 | 83 | 164 | 87 | 451 |
| A8 | 2.55 | 29 | 225 | 30 | 618 |
| A9 | 2.6 | 84 | 385 | 89 | 1058 |
| A10 | 2.9 | 86 | 332 | 90 | 913 |
| A11 | 2.1 | 89 | 321 | 93 | 883 |
| A12 | 2.2 | 90 | 315 | 95 | 866 |
| A13 | 2.25 | 90 | 305 | 95 | 839 |
| A14 | 2.3 | 91 | 295 | 96 | 811 |
| A15 | 2.35 | 91 | 270 | 96 | 743 |
| A16 | 2.4 | 92 | 230 | 97 | 633 |
| A17 | 2.5 | 92 | 215 | 97 | 591 |
| A18 | 2.55 | 93 | 210 | 98 | 578 |
| A19 | 2.6 | 93 | 205 | 98 | 564 |
| A20 | 2.9 | 93 | 164 | 98 | 451 |

When A1 and A8 are used as the negative electrode active materials, the P values of the air batteries on the 160 mA discharge and the P values of the alkaline dry batteries on the 1 A discharge are as low as 30% or less. This indicates that when the specific surface area of the zinc or zinc alloy is less than 0.01 $m^2/g$, the P values on high rate discharge become low. Also, when A7 and A20 are used as the negative electrode active materials, the battery capacities of the air batteries on the 3 mA discharge are as low as approximately 400 mAh. Also, the battery capacities of the alkaline dry batteries on the 50 mA discharge are as low as approximately 1100 mAh. This indicates that when the specific surface area of the zinc or zinc alloy is greater than 10 $m^2/g$, the discharge capacities become low even on a low current discharge.

From the above, it can be seen that the specific surface area of the zinc or zinc alloy is less than 0.01 $m^2/g$ and greater than 10 $m^2/g$, the discharge characteristics are poor.

However, even if the specific surface area of the zinc or zinc alloy powder as the negative electrode active material is in the range of 0.01 to 10 m$^2$/g, good characteristics are not obtained unless the weight ratio (electrolyte)/(negative electrode active material) is appropriate.

That is, if the weight ratio (electrolyte)/(negative electrode active material) is less than 0.1, the P values (%) of the air batteries on the 160 mA discharge and the P values (%) of the alkaline dry batteries on the 1A discharge are as low as 20% or less. Also, if the weight ratio (electrolyte)/(negative electrode active material) is greater than 2, the discharge capacities of the air batteries on the 3 mA discharge are 400 mAh or less and the discharge capacities of the alkaline dry batteries on the 50 mA discharge are as low as approximately 1000 mAh.

amount of each of these elements added to zinc, if it is in the range of 20 ppm to 5000 ppm, gas production can be effectively prevented. If it is in the range of 50 ppm to 1000 ppm, gas production can be more effectively prevented.

Example 2

Air batteries and alkaline dry batteries were produced by setting the specific surface area of the zinc or zinc alloy powder to 0.01 to 10 m$^2$/g, setting the weight ratio (electrolyte)/(negative electrode active material) to 0.1 to 2, and adding lithium hydroxide to the negative electrode mixture in various ratios. The P values (%) and battery capacities (mAh) of these batteries were measured under the same conditions as those of Example 1. Table 3 shows the results.

TABLE 3

| Material | Electrolyte/ (zinc or zinc alloy) weight ratio | Content of lithium hydroxide (wt %) | Air battery | | Alkaline dry battery | |
|---|---|---|---|---|---|---|
| | | | P (%) on 160 mA discharge | Capacity (mAh) on 3 mA discharge | P (%) on 1 A discharge | Capacity (mAh) on 50 mA discharge |
| A3  | 0.31 | 0.1  | 70 | 920 | 74 | 2576 |
| A3  | 0.31 | 0.15 | 85 | 921 | 89 | 2579 |
| A3  | 0.31 | 0.2  | 87 | 923 | 91 | 2584 |
| A3  | 0.31 | 0.4  | 88 | 925 | 92 | 2590 |
| A3  | 0.31 | 0.6  | 89 | 922 | 93 | 2582 |
| A3  | 0.31 | 0.7  | 90 | 920 | 95 | 2576 |
| A3  | 0.31 | 0.9  | 91 | 919 | 96 | 2573 |
| A3  | 0.31 | 1    | 91 | 780 | 96 | 2184 |
| A17 | 0.34 | 0.1  | 72 | 900 | 76 | 2520 |
| A17 | 0.34 | 0.15 | 87 | 902 | 91 | 2526 |
| A17 | 0.34 | 0.2  | 90 | 905 | 95 | 2534 |
| A17 | 0.34 | 0.4  | 91 | 906 | 96 | 2537 |
| A17 | 0.34 | 0.6  | 92 | 910 | 97 | 2548 |
| A17 | 0.34 | 0.7  | 93 | 905 | 98 | 2534 |
| A17 | 0.34 | 0.9  | 93 | 908 | 98 | 2542 |
| A17 | 0.34 | 1    | 94 | 690 | 99 | 1932 |

This indicates that even if the specific surface area of the zinc or zinc alloy powder as the negative electrode active material is in the range of 0.01 to 10 m$^2$/g, when the weight ratio (electrolyte)/(negative electrode active material) is less than 0.1 and greater than 2, the discharge characteristics are poor. Therefore, when the specific surface area of the negative electrode active material powder is in the range of 0.01 to 10 m$^2$/g and the weight ratio (electrolyte)/(negative electrode active material) is in the range of 0.1 to 2, alkaline batteries such as air batteries and alkaline dry batteries exhibit excellent discharge characteristics.

In the above range, when the specific surface area of the negative electrode active material powder is in the range of 0.1 to 5 m$^2$/g and the weight ratio (electrolyte)/(negative electrode active material) is in the range of 0.2 to 0.7, both high-rate discharge characteristics and high discharge capacities are obtained. That is, with the air batteries, the P values on the 160 mA discharge are 70 or more and the capacities on the 3 mA discharge are greater than 900 mA. Also, with the alkaline dry batteries, the P values on the 1 A discharge are 76 or more and the capacities on the 50 mA discharge are greater than 2500 mA.

In the case of the batteries using zinc alloys containing at least one element selected from the group consisting of Al, Bi, In, and Ca in their negative electrodes, almost no leakage occurred after discharge. This is probably because alloying suppresses the production of hydrogen gas. Further, the addition of Sn and/or Pb is also effective. With respect to the When the amount of lithium hydroxide contained in the negative electrode mixture is less than 0.15 wt %, the P values of the air batteries and alkaline dry batteries are in the 70% range. When the amount of lithium hydroxide is greater than 0.9 wt %, the discharge capacities of the air batteries and alkaline dry batteries were not more than 800 mAh and not more than 2200 mAh, respectively.

When the amount of lithium hydroxide contained in the negative electrode mixture is in the range of 0.15 to 0.9 wt %, the P values of the air batteries and alkaline dry batteries were good, specifically 85% or more, and the discharge capacities of the air batteries and alkaline dry batteries were good, specifically not less than 900 mAh and not less than 2500 mAh, respectively.

Also, the effects obtained by the addition of Al and the like to the zinc of the negative electrode were essentially the same as those in Example 1.

INDUSTRIAL APPLICABILITY

The present invention is useful for alkaline batteries, such as air batteries and alkaline dry batteries, that use zinc or a zinc alloy as a negative electrode active material.

The invention claimed is:

1. An alkaline battery comprising: a negative electrode including an electrode mixture that contains a zinc or zinc alloy powder as an active material; an alkaline electrolyte; and a positive electrode, wherein said zinc or zinc alloy powder has a specific surface area of 0.01 to 10 m²/g, and the weight ratio of the alkaline electrolyte contained in the battery to the active material (electrolyte/negative electrode active material) is in the range of 0.1 to 2, and
said electrode mixture contains 0.15 to 0.9 wt % of lithium hydroxide.

2. The alkaline battery in accordance with claim 1, wherein said zinc or zinc alloy powder has a specific surface area of 0.1 to 5 m²/g, and the weight ratio of the alkaline electrolyte contained in the battery to the active material is in the range of 0.2 to 0.7.

* * * * *